(12) United States Patent
Entrekin

(10) Patent No.: US 10,627,122 B2
(45) Date of Patent: Apr. 21, 2020

(54) BOX FAN SECURING DEVICES AND METHODS OF MAKING AND USING THE SAME

(71) Applicant: Clifford Frank Entrekin, Hampton, GA (US)

(72) Inventor: Clifford Frank Entrekin, Hampton, GA (US)

(*) Notice: Subject to any disclaimer, the term of this patent is extended or adjusted under 35 U.S.C. 154(b) by 0 days.

(21) Appl. No.: 16/027,520

(22) Filed: Jul. 5, 2018

(65) Prior Publication Data

US 2019/0011142 A1 Jan. 10, 2019

Related U.S. Application Data

(60) Provisional application No. 62/529,092, filed on Jul. 6, 2017.

(51) Int. Cl.
| | |
|---|---|
| *F16M 13/02* | (2006.01) |
| *F24F 7/013* | (2006.01) |
| *F24F 13/32* | (2006.01) |
| *F24F 13/20* | (2006.01) |
| *F16B 2/12* | (2006.01) |

(52) U.S. Cl.
CPC .......... *F24F 7/013* (2013.01); *F16M 13/02* (2013.01); *F24F 13/20* (2013.01); *F24F 13/32* (2013.01); *F16B 2/12* (2013.01); *F24F 2013/205* (2013.01)

(58) Field of Classification Search
USPC ........................................ 248/674
See application file for complete search history.

(56) References Cited

U.S. PATENT DOCUMENTS

| | | | | |
|---|---|---|---|---|
| 2,758,456 | A * | 8/1956 | Wheeler | F24F 1/027 248/236 |
| 2,945,358 | A * | 7/1960 | MacLeod | F24F 1/04 248/208 |
| 3,680,258 | A * | 8/1972 | Loyd | E06B 7/02 49/168 |
| 4,453,456 | A * | 6/1984 | Szkudlarek | E06B 7/03 160/89 |
| 5,050,831 | A * | 9/1991 | Joyal | F24F 7/013 248/208 |
| 5,195,869 | A * | 3/1993 | Groenhoff | F04D 29/601 248/208 |
| 5,425,671 | A * | 6/1995 | Cunning | F24F 7/013 454/200 |
| 6,173,930 | B1 * | 1/2001 | Arbucci | F24F 1/027 108/47 |
| 7,350,759 | B1 * | 4/2008 | Gray | F24F 1/027 248/644 |
| 7,975,441 | B2 * | 7/2011 | McCarriston | F24F 1/027 248/208 |
| 8,584,998 | B1 * | 11/2013 | Peterson | F24F 13/32 182/62 |
| 8,678,889 | B2 * | 3/2014 | Dean | B08B 15/02 269/130 |
| 9,982,909 | B1 * | 5/2018 | Perez | F24F 13/32 |
| 2006/0223434 | A1 * | 10/2006 | Barker | E06B 7/10 454/203 |

\* cited by examiner

*Primary Examiner* — Monica E Millner
(74) *Attorney, Agent, or Firm* — Withers & Keys, LLC

(57) ABSTRACT

Box fan securing devices are disclosed. Methods of making and using box fan securing devices are also disclosed.

20 Claims, 12 Drawing Sheets

BOX FAN SECURING DEVICES AND METHODS OF MAKING AND USING THE SAME

CROSS-REFERENCE TO RELATED APPLICATIONS

This patent application claims the benefit of priority to U.S. Provisional Patent Application Ser. No. 62/529,092 filed on Jul. 6, 2017 and entitled "BOX FAN SECURING DEVICES AND METHODS OF MAKING AND USING THE SAME," the subject matter of which is hereby incorporated by reference in its entirety.

FIELD OF THE INVENTION

The present invention is directed to box fan securing devices and methods of making and using the same.

BACKGROUND

Efforts continue to further develop products for securing a box fan and a window sash of a window.

SUMMARY

The present invention addresses some of the efforts discussed above by the discovery of new box fan securing devices and methods of making and using the same.

Accordingly, the present invention is directed to box fan securing devices. In one exemplary embodiment, the box fan securing device comprises: a device central portion; and first and second sash-contacting members extending upward from the device central portion, the first and second sash-contacting members being spaced from one another by a distance $D_u$ that is less than, equal to, or greater than a window sash width $W_{wf}$; at least a portion of the device central portion (i) being an integral component of a fan or (ii) being connectable to the fan, said box fan securing device being sized so as to be extend from an outer surface of the fan to a window sash edge of a window sash so as to secure the fan to the window sash.

In another exemplary embodiment, the box fan securing device comprises: (i) a device central portion; (ii) first and second sash-contacting members extending upward from the device central portion, the first and second sash-contacting members being spaced from one another by a distance $D_u$ that is less than, equal to, or greater than a window sash width $W_{wf}$; and (iii) first and second fan-contacting members extending downward from the device central portion, the first and second fan-contacting members being spaced from one another by a distance $D_d$ that is less than, equal to, or greater than a fan width $W_f$; the box fan securing device being sized so as to be positionable between a window sash edge of a window sash and a fan edge of a fan so as to secure the fan to the window sash.

In another exemplary embodiment, the box fan securing device comprises: (a) a base component comprising (i) a first sash-contacting member and (ii) one or more fan engaging members; and (b) a top component comprising a second sash-contacting member, the second sash-contacting member being movable relative to the first sash-contacting member, the box fan securing device being sized so as to be positionable between a window sash edge of a window sash and an outer surface of a fan so as to secure the fan to the window sash.

In another exemplary embodiment, the box fan securing device comprises: (a) a base component comprising (i) a first sash-contacting member and (ii) a first fan-contacting member; (b) a front component comprising a second fan-contacting member, the second fan-contacting member being movable relative to the first fan-contacting member; and (c) a top component comprising a second sash-contacting member, the second sash-contacting member being movable relative to the first sash-contacting member, the box fan securing device being sized so as to be positionable between a window sash edge of a window sash and a fan edge of a fan so as to secure the fan to the window sash.

The present invention is further directed to methods of making box fan securing devices. In one exemplary embodiment, the method of making a box fan securing device comprises: forming a device central portion with first and second sash-contacting members extending upward from the device central portion, the first and second sash-contacting members being spaced from one another by a distance $D_u$ that is less than, equal to, or greater than a window sash width $W_{wf}$; at least a portion of the device central portion (i) being an integral component of a fan or (ii) being connectable to the fan, the box fan securing device being sized so as to be extend from an outer surface of the fan to a window sash edge of a window sash so as to secure the fan to the window sash.

In another exemplary embodiment, the method of making a box fan securing device comprises: forming a device central portion with (i) first and second sash-contacting members extending upward from the device central portion, the first and second sash-contacting members being spaced from one another by a distance $D_u$ that is less than, equal to, or greater than a window sash width $W_{wf}$; and (ii) first and second fan-contacting members extending downward from the device central portion, the first and second fan-contacting members being spaced from one another by a distance $D_d$ that is less than, equal to, or greater than a fan width $W_f$; the box fan securing device being sized so as to be positionable between a window sash edge of a window sash and a fan edge of a fan so as to secure the fan to the window sash.

In yet another exemplary embodiment, the method of making a box fan securing device comprises: forming a base component comprising (i) a first sash-contacting member and (ii) a first fan-contacting member; forming a front component comprising a second fan-contacting member, the second fan-contacting member being movable relative to the first fan-contacting member; and forming a top component comprising a second sash-contacting member, the second sash-contacting member being movable relative to the first sash-contacting member, the box fan securing device being sized so as to be positionable between a window sash edge of a window sash and a fan edge of a fan so as to secure the fan to the window sash.

The present invention further relates to methods of using a box fan securing device. In one exemplary embodiment, the method of using a box fan securing device comprises: positioning a box fan securing device between a window sash and a box fan, the box fan securing device comprising: (i) a device central portion; (ii) first and second sash-contacting members extending upward from the device central portion, the first and second sash-contacting members being spaced from one another by a distance $D_u$ that is less than, equal to, or greater than a window sash width $W_{wf}$; and (iii) first and second fan-contacting members extending downward from the device central portion, the first and second fan-contacting members being spaced from one another by a distance $D_d$ that is less than, equal to, or greater than a fan width $W_f$.

In another exemplary embodiment, the method of using a box fan securing device comprises: positioning a box fan securing device between a window sash and a box fan, the box fan securing device comprising: (a) a base component comprising (i) a first sash-contacting member and (ii) a first fan-contacting member; (b) a front component comprising a second fan-contacting member, the second fan-contacting member being movable relative to the first fan-contacting member; and (c) a top component comprising a second sash-contacting member, said second sash-contacting member being movable relative to said first sash-contacting member, the box fan securing device being sized so as to be positionable between a window sash edge of a window sash and a fan edge of a fan so as to secure the fan to the window sash.

These and other features and advantages of the present invention will become apparent after a review of the following detailed description of the disclosed embodiments and the appended claims.

DETAILED DESCRIPTION

Figure 1:
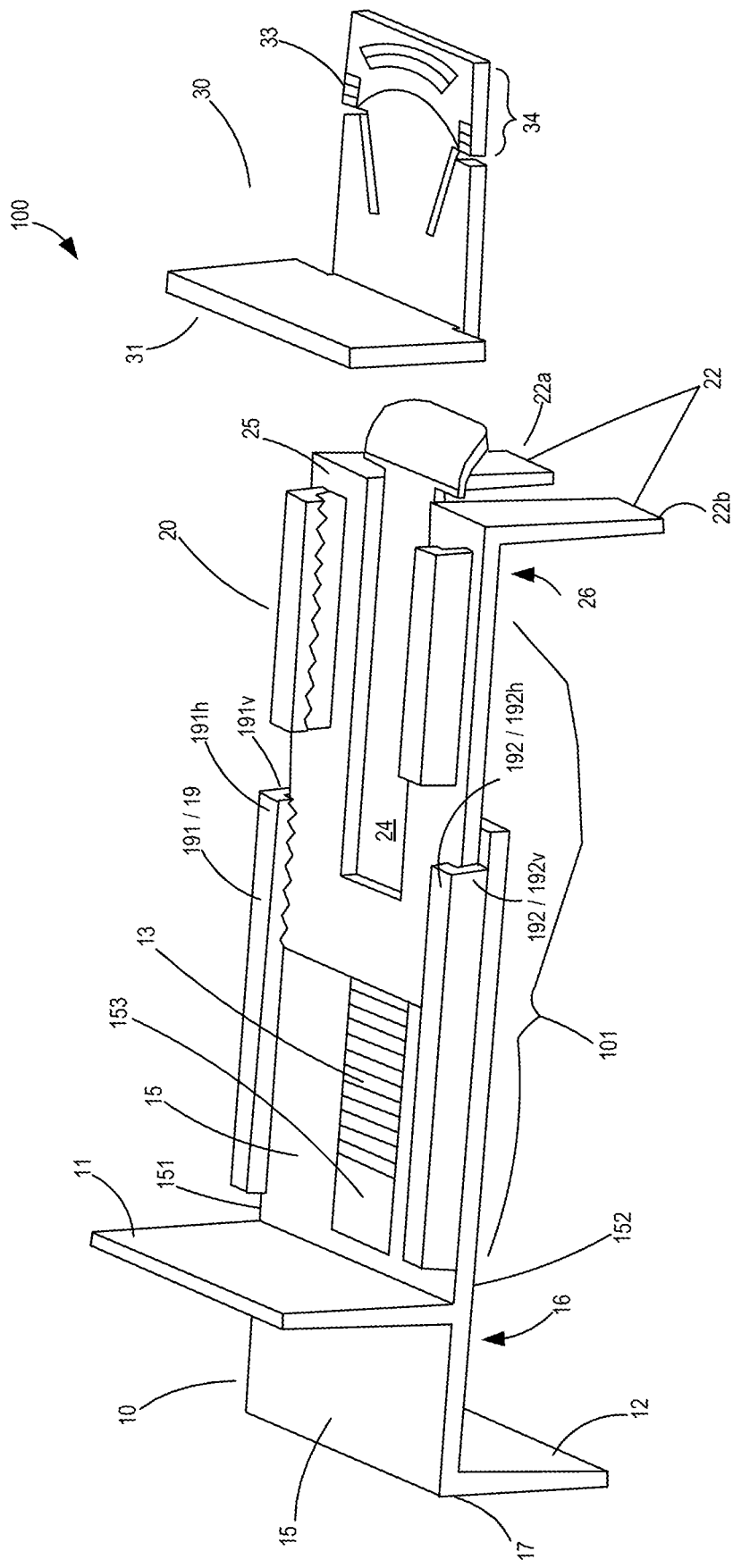
FIG. 1 depicts a perspective view of exemplary components of an exemplary box fan securing device of the present invention.
Figure 2:
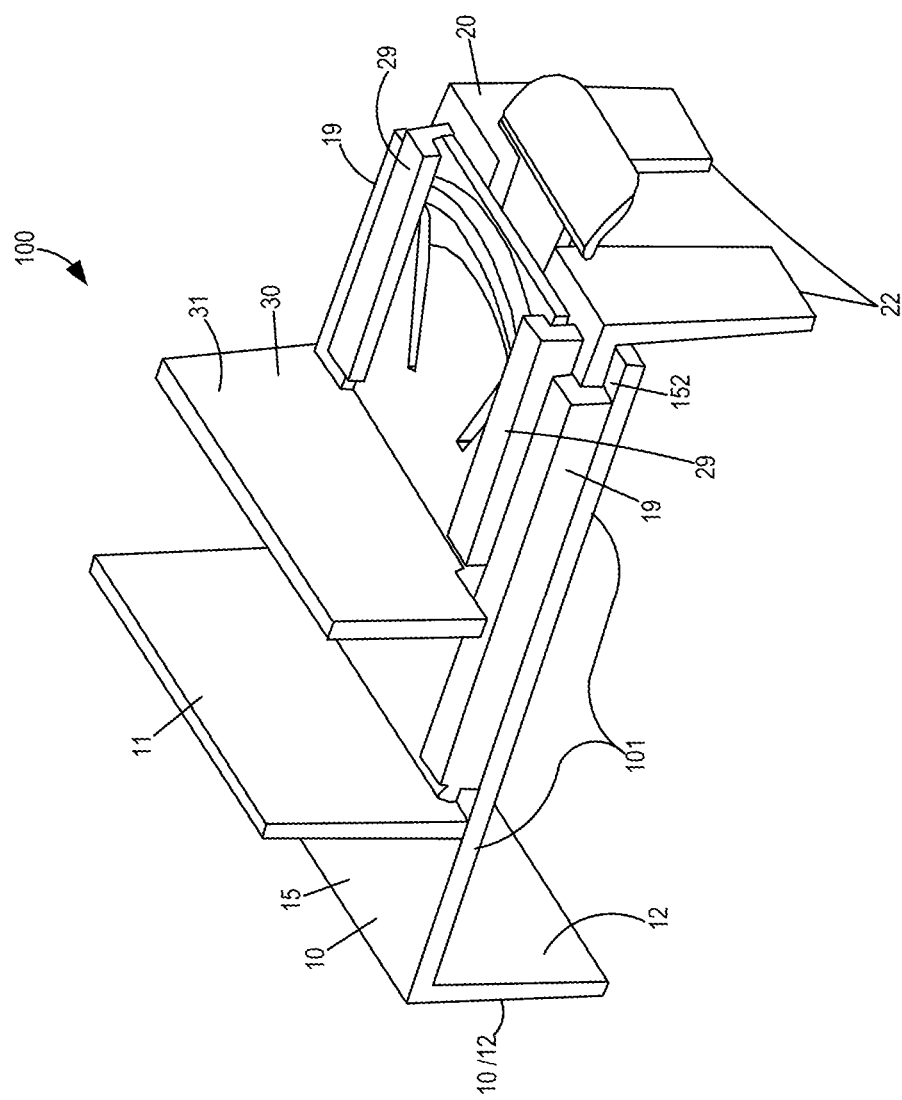
FIG. 2 depicts a perspective view of the exemplary box fan securing device shown in FIG. 1 with the exemplary components engaged with one another.
Figure 3:
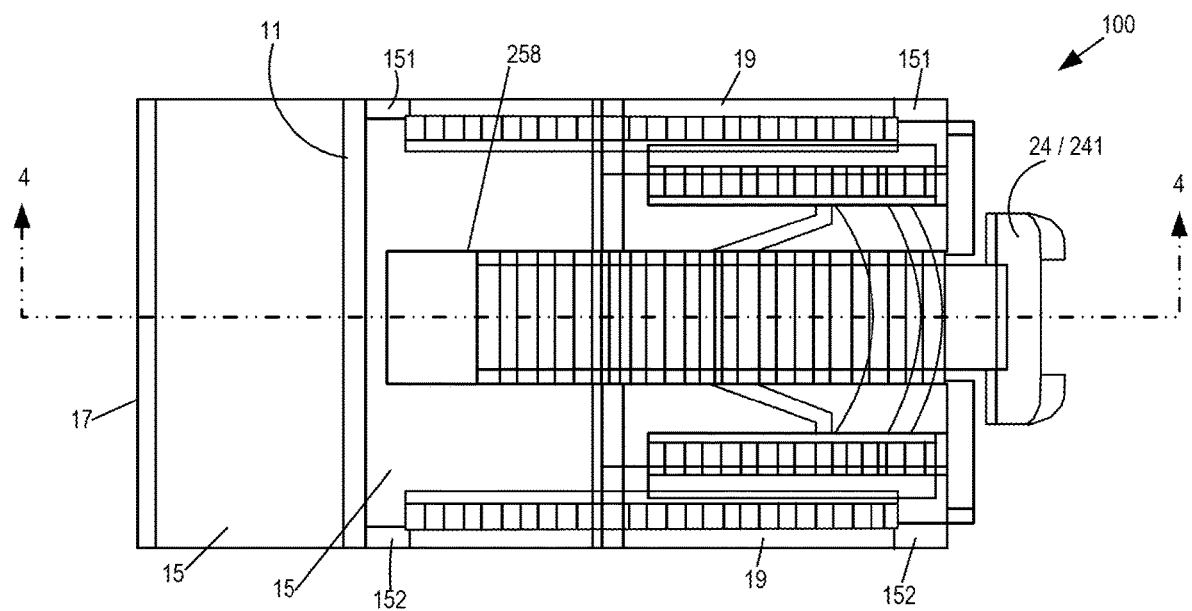
FIG. 3 depicts a top view of the exemplary box fan securing device shown in FIG. 2.
Figure 4:
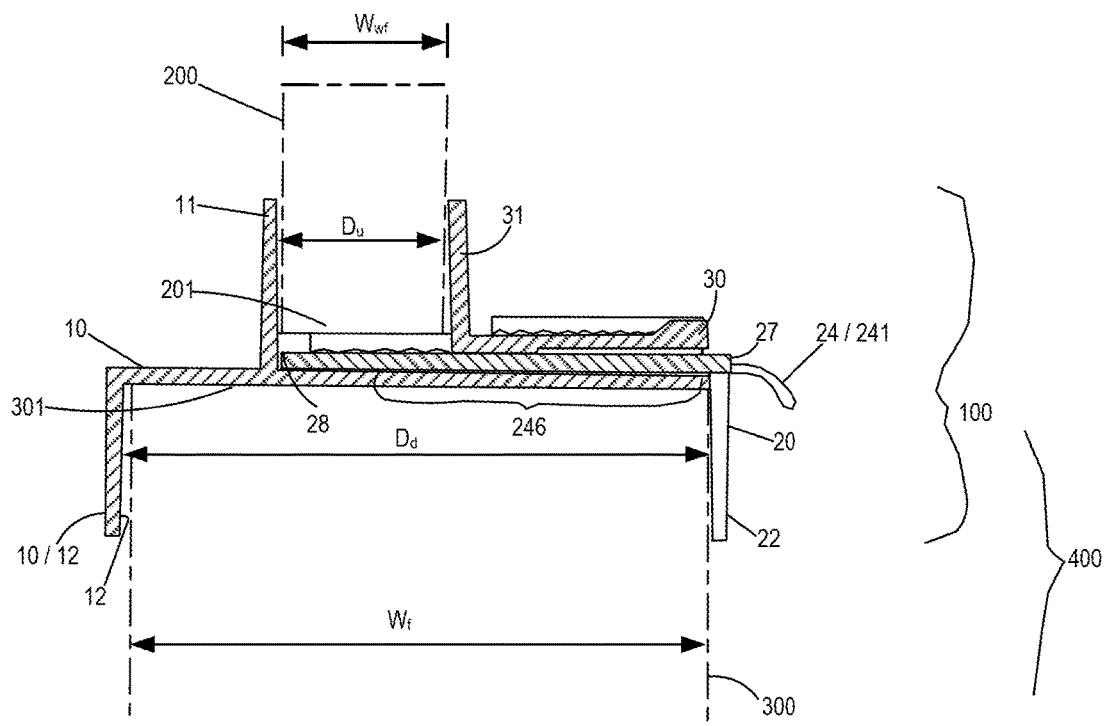
FIG. 4 depicts a cross-sectional view of the exemplary box fan securing device shown in FIG. 3 as viewed along line 4-4.
Figure 5:
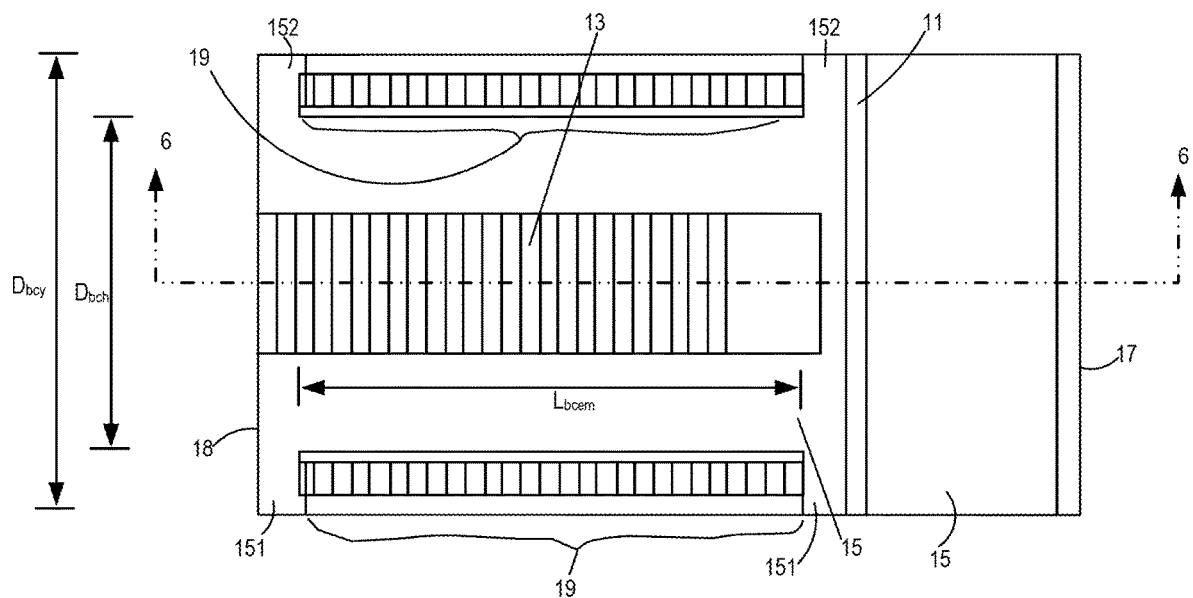
FIG. 5 depicts a top view of the exemplary base component of the exemplary box fan securing device shown in FIGS. 1-2 and 4.
Figure 6:
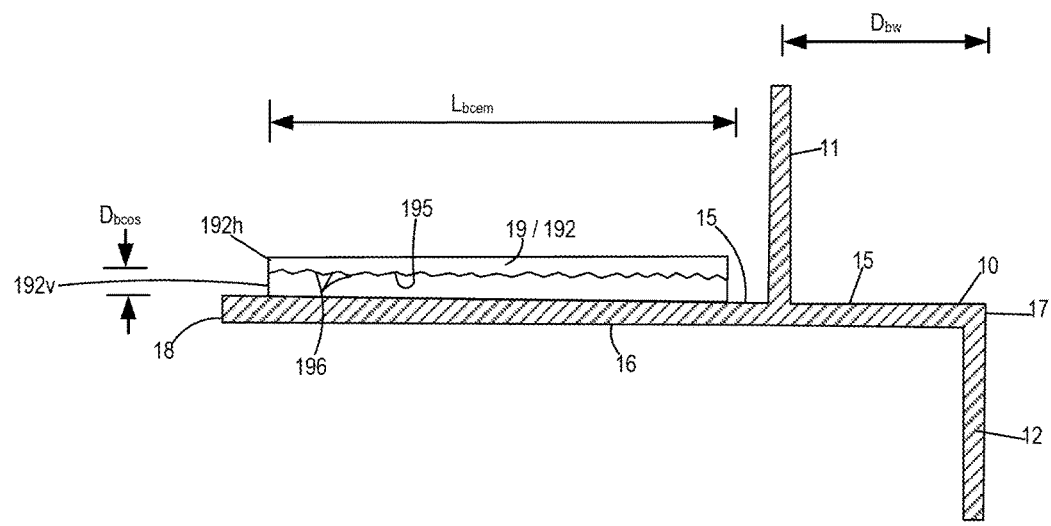
FIG. 6 depicts a cross-sectional view of the exemplary base component shown in FIG. 5 as viewed along line 6-6.
Figure 7:
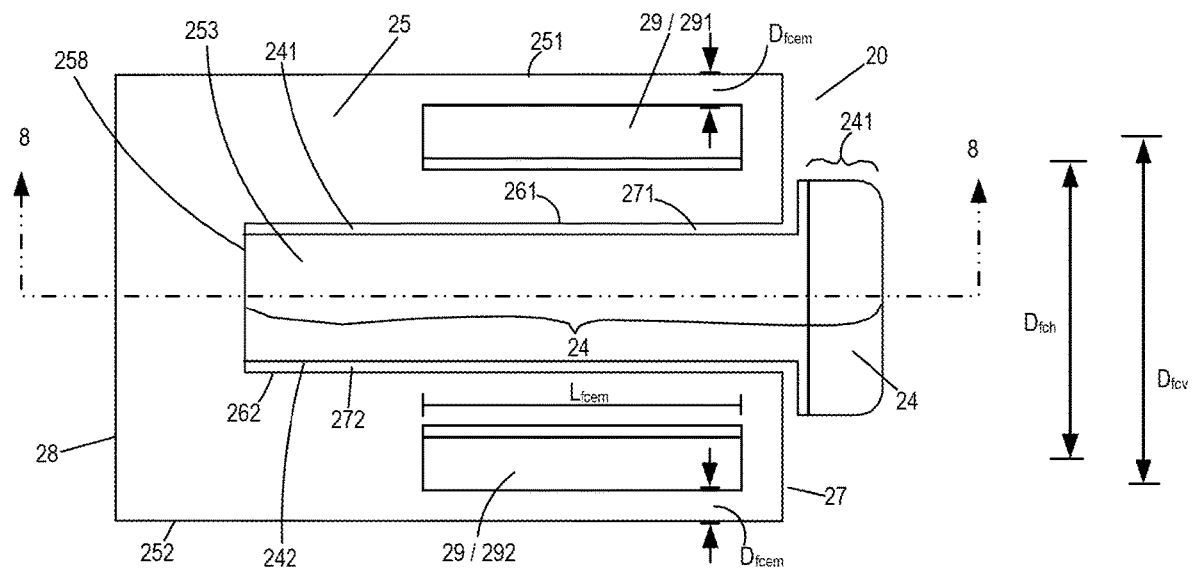
FIG. 7 depicts a top view of the exemplary front component of the exemplary box fan securing device shown in FIGS. 1-4.
Figure 8:
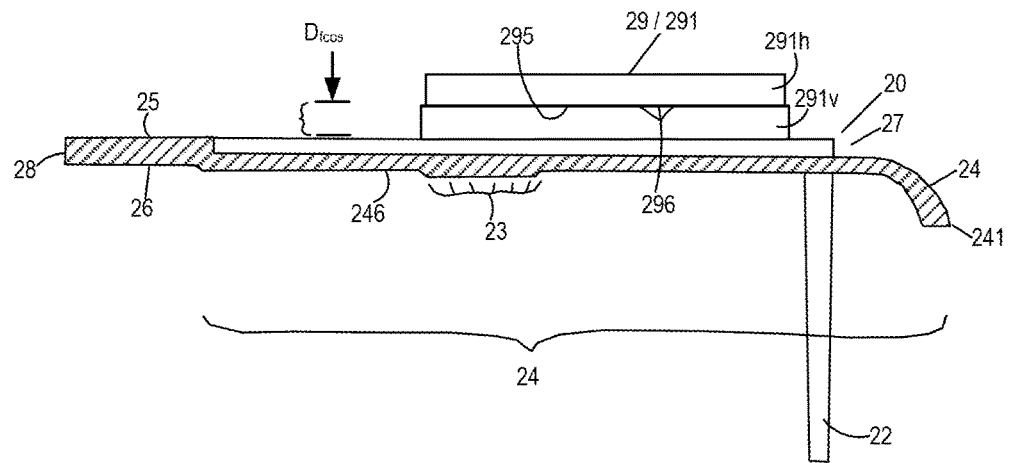
FIG. 8 depicts a cross-sectional view of the exemplary front component shown in FIG. 7 as viewed along line 8-8.
Figure 9:
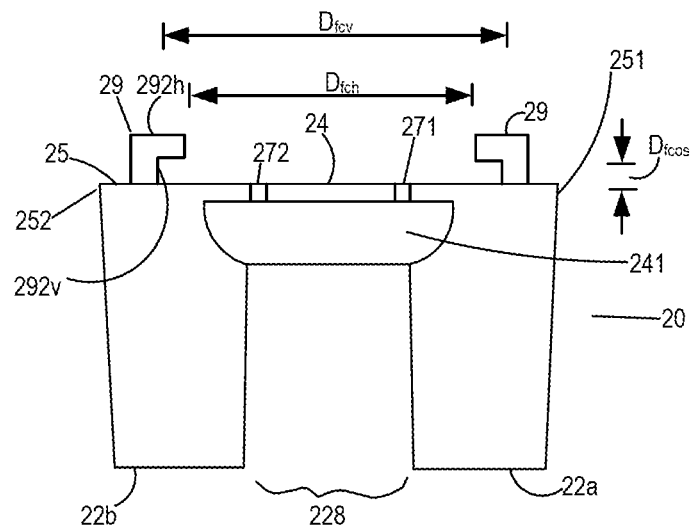
FIG. 9 depicts a side view of the exemplary front component shown in FIGS. 7-8 as viewed from a right-hand side.
Figure 10:
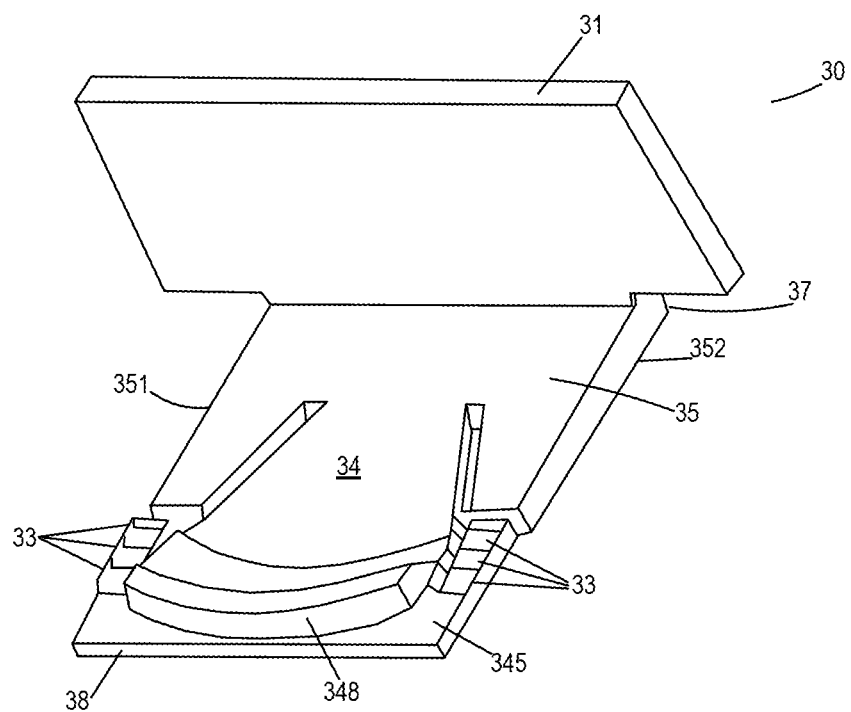
FIG. 10 depicts a perspective view of the exemplary top component of the exemplary box fan securing device shown in FIGS. 1-4.
Figure 11:
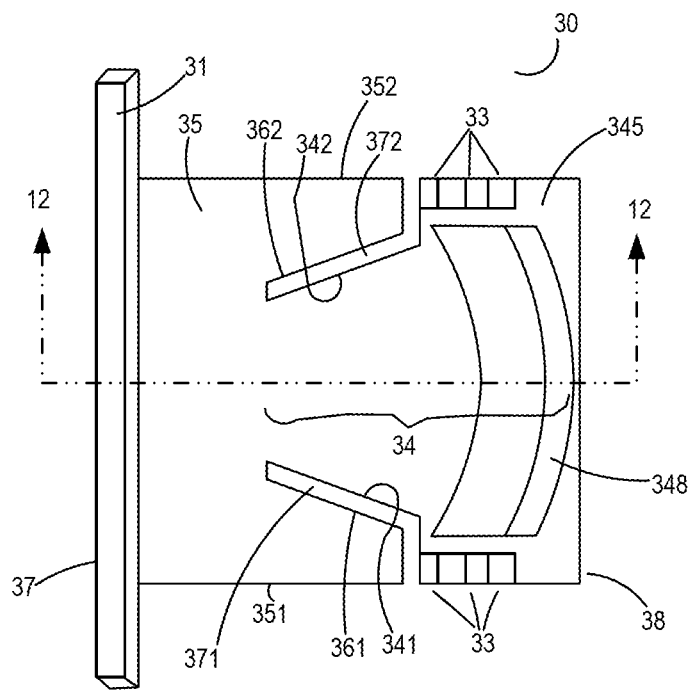
FIG. 11 depicts a top view of the exemplary top component shown in FIGS. 1-4 and 10.
Figure 12:
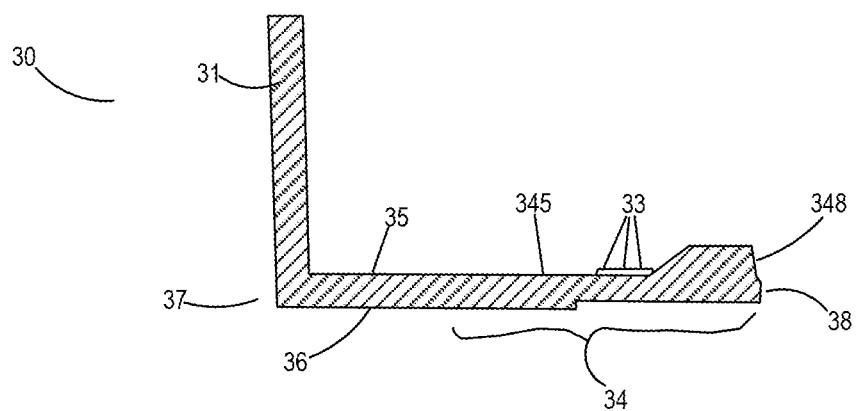
FIG. 12 depicts a cross-sectional view of the exemplary top component shown in FIG. 11 as viewed along line 12-12.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to box fan securing devices. The present invention is further directed to methods of making box fan securing devices. The present invention is even further directed to methods of using box fan securing devices to secure a box fan within a window sash.

The box fan securing devices and methods of making and using box fan securing devices of the present invention are further described in the following embodiments.

OTHER EMBODIMENTS

Box Fan Securing Devices

1. A box fan securing device 100 comprising: a device central portion 101; and first and second sash-contacting members 11/31 extending upward from said device central portion 101, said first and second sash-contacting members 11/31 being spaced from one another by a distance $D_u$ that is less than, equal to, or greater than a window sash width $W_{wf}$; wherein at least a portion of said device central portion 101 (i) is an integral component of a fan 300 or (ii) is connectable to the fan 300, said box fan securing device 100 being sized so as to extend from an outer surface 315 of the fan 300 to a window sash edge 201 of a window sash 200 so as to secure the fan 300 to the window sash 200.

2. The box fan securing device 100 of embodiment 1, wherein at least a portion of said device central portion 101 is an integral component of the fan 300.

3. The box fan securing device 100 of embodiment 1 or 2, wherein at least a portion of said device central portion 101 forms an outer surface 315 of the fan 300.

4. The box fan securing device 100 of any one of embodiments 1 to 3, wherein at least a portion of said device central portion 101 forms an outer upper surface 315 of the fan 300.

5. The box fan securing device 100 of embodiment 1, wherein at least a portion of said device central portion 101 is connectable to the fan 300.

6. The box fan securing device 100 of embodiment 1 or 5, wherein said device central portion 101 comprises one or more fan engaging members 305, each sized and configured to be connectable to one or more complementary fan connecting components 310 of the fan 300.

7. The box fan securing device 100 of any one of embodiments 1 and 5 to 6, wherein said device central portion 101 comprises two or more fan engaging members 305, each sized and configured to be connectable to one or more complementary fan connecting components 310 of the fan 300.

Figure 13:
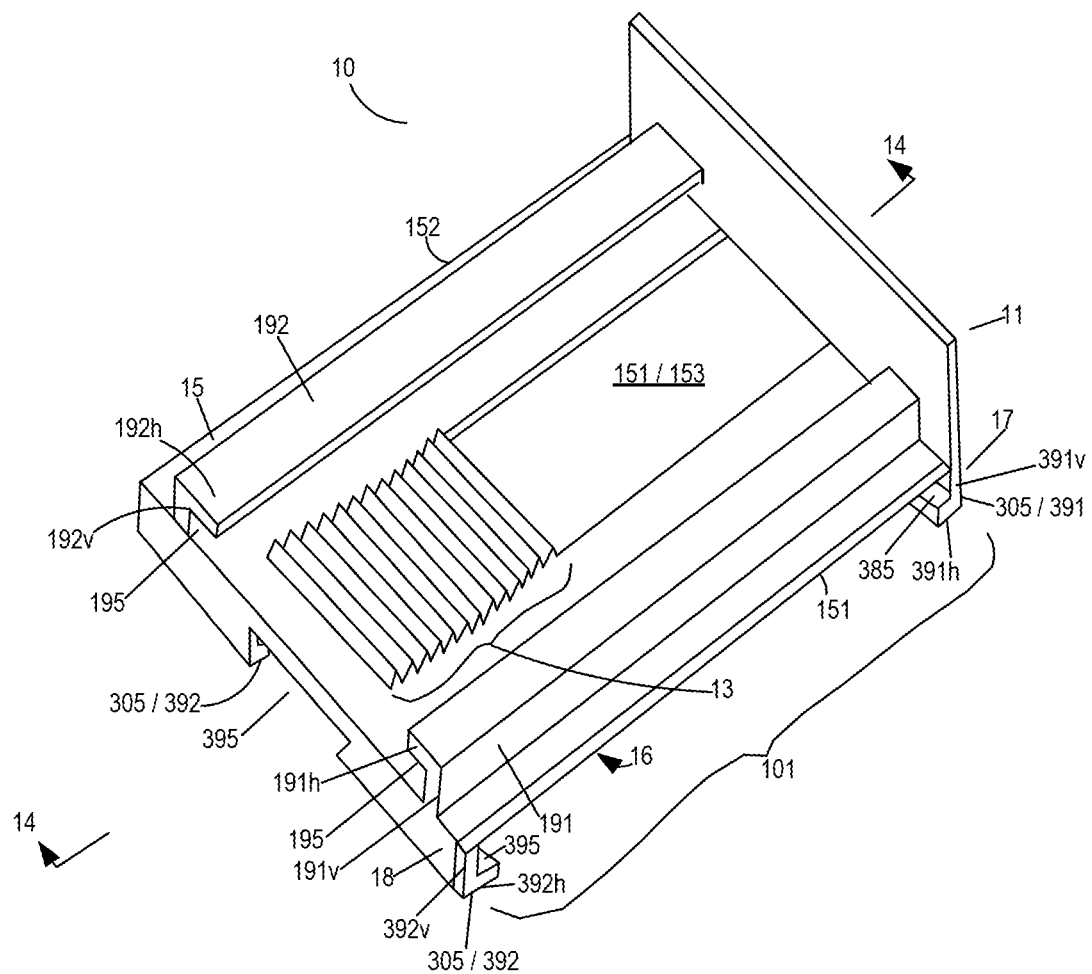
FIG. 13 depicts a perspective view of another exemplary base component of a box fan securing device.
Figure 14:
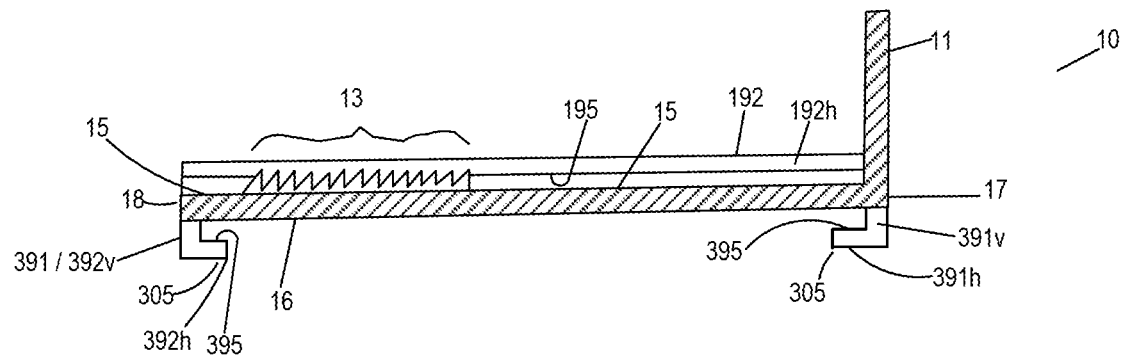
FIG. 14 depicts a cross-sectional view of the exemplary base component shown in FIG. 13 as viewed along line 14-14 shown in FIG. 13.
Figure 15:
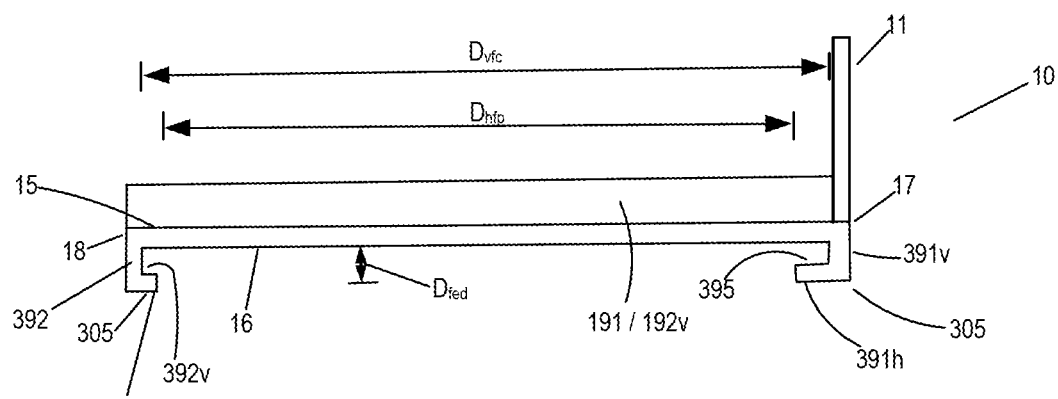
FIG. 15 depicts a side view of the exemplary base component shown in FIG. 13.
Figure 16:
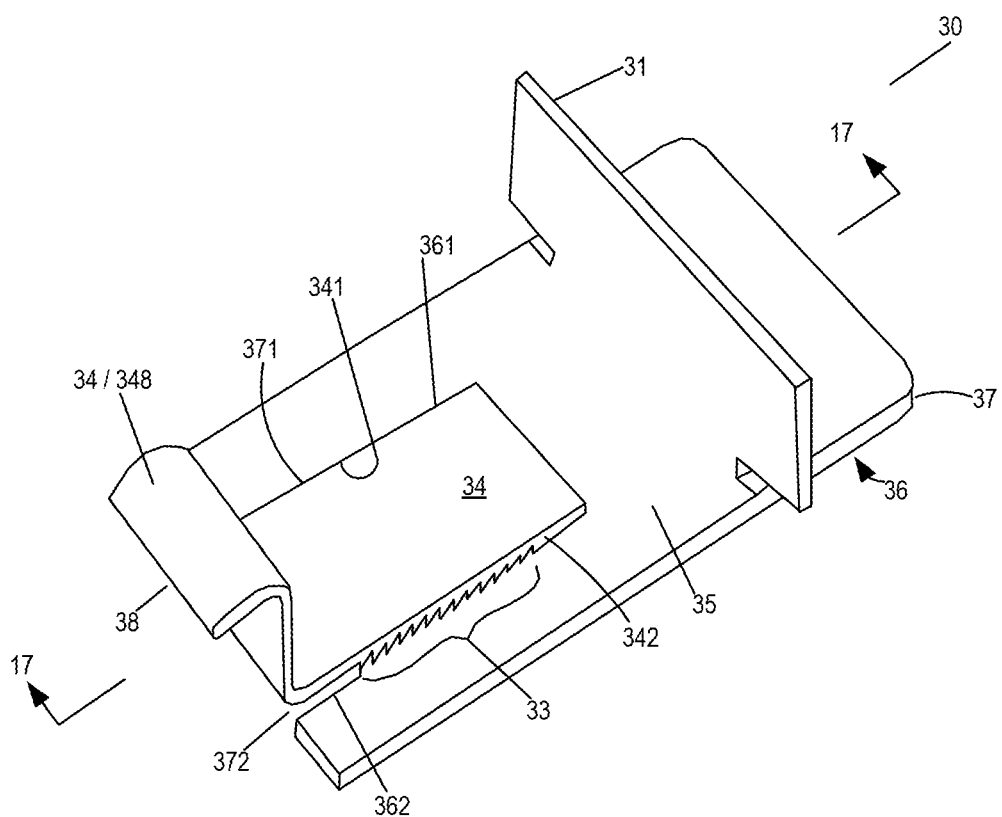
FIG. 16 depicts a perspective view of another exemplary top component suitable for use (i) in the exemplary box fan securing device shown in FIGS. 1-4 or (ii) with the exemplary base component of a box fan securing device shown in FIG. 13.
Figure 17:
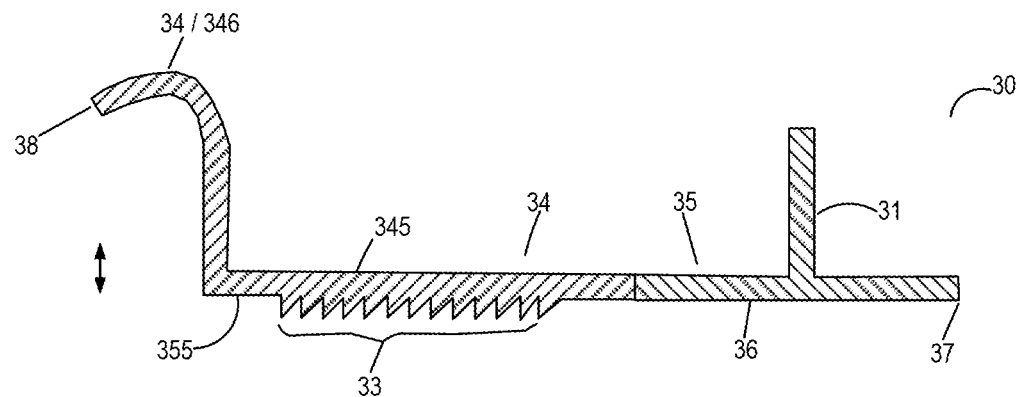
FIG. 17 depicts a cross-sectional view of the exemplary top component shown in FIG. 16 as viewed along line 17-17 shown in FIG. 16.
Figure 18:
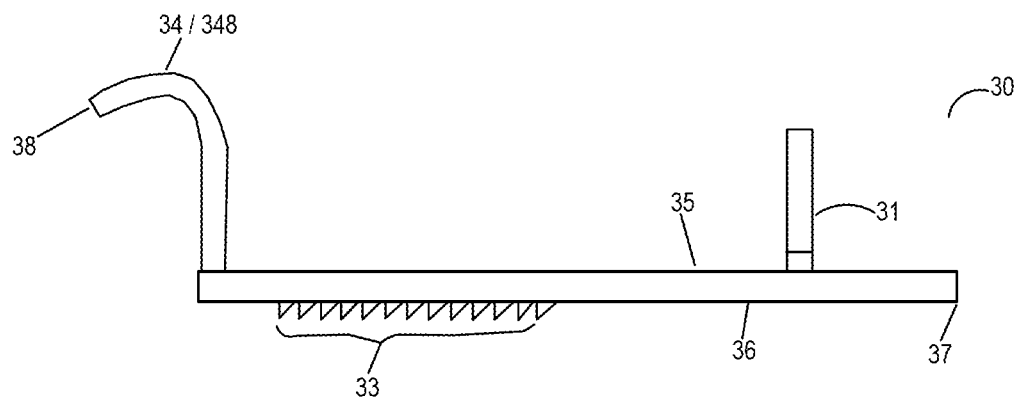
FIG. 18 depicts a side view of the exemplary top component shown in FIG. 17.
Figure 19:
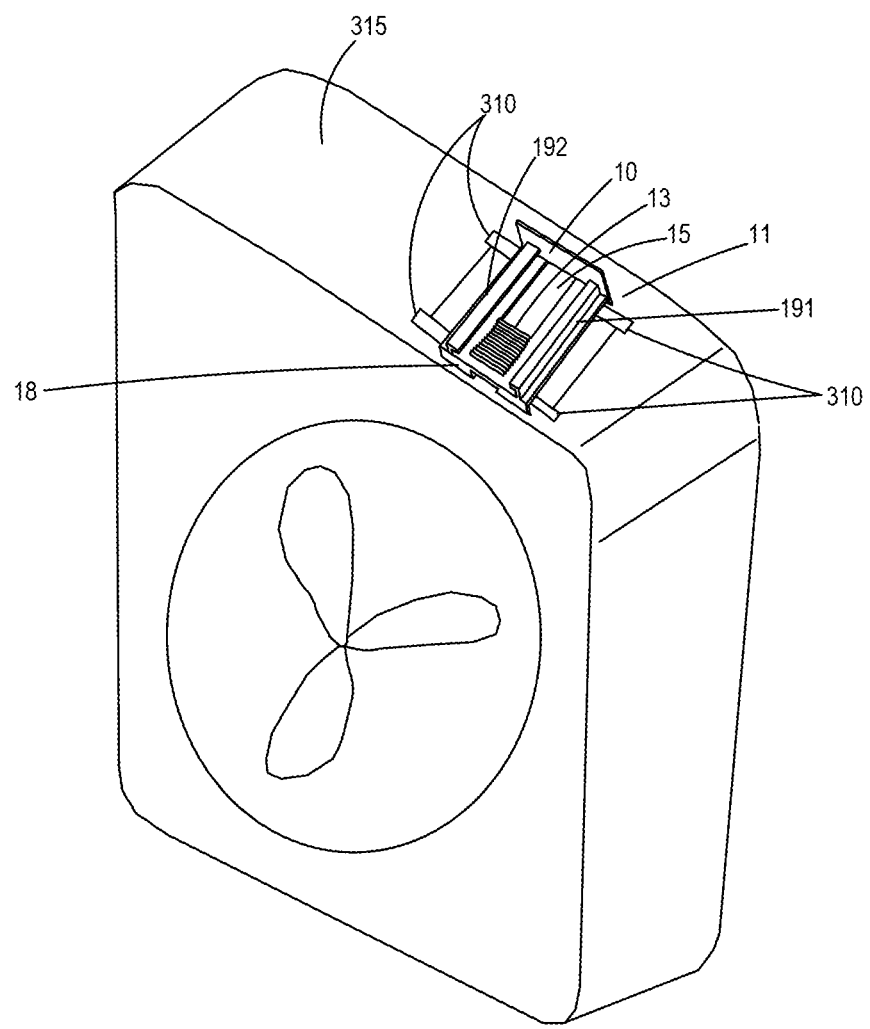
FIG. 19 depicts the exemplary base component of a box fan securing device shown in FIG. 13 attached to an outer surface of a box fan.

8. The box fan securing device 100 of any one of embodiments 1 and 5 to 7, wherein said device central portion 101 comprises four fan engaging members 305, each sized and configured to be connectable to one or more complementary fan connecting components 310 of the fan 300. As shown in FIG. 13, exemplary device central portion 101 (i.e., exemplary base component 10) comprises four fan engaging members 305, with (i) two fan engaging members 305 being along edge 17 and separated from one another by a gap 395, and (ii) two fan engaging members 305 being along opposite edge 18 and separated from one another by another gap 395.

9. The box fan securing device 100 of any one of embodiments 6 to 8, wherein said one or more fan engaging members 305 comprises (i) one or more first fan engaging members 391/392 positioned along a first edge 17 of said device central portion 101, each of the one or more first fan engaging members 391/392 comprising a first fan engaging member 391 comprising a first vertically-extending fan engaging member wall 391$v$ and a first horizontally-extending fan engaging member projection 391$h$ extending towards a central portion 153 of said device central portion 101, and (ii) one or more second fan engaging members 392 positioned along an opposite edge 18 of said device central portion 101, each of the one or more second fan engaging members 392 comprising a second vertically-extending fan engaging member wall 392$v$ and a second horizontally-extending fan engaging member projection 392$h$ extending towards a central portion 153 of said device central portion 101 so that a distance $D_{bfp}$ between said first and second horizontally-extending base component projections 391$h$/392$h$ is less than a distance $D_{vfc}$ between said first and second vertically-extending fan engaging member walls 391$v$/392$v$.

10. The box fan securing device 100 of embodiment 9, wherein a fan engaging member upper overhanging surface 395 of each of said first and second horizontally-extending fan engaging member projections 391$h$/392$h$ is a fan engaging member distance $D_{fed}$ below a lower surface 16 of said device central portion 101 with the fan engaging member distance $D_{fed}$ being substantially equal to a thickness of opposite outer side edges 851/852 of the one or more complementary fan connecting components 310 so that the opposite outer side edges 851/852 of the one or more complementary fan connecting components 310 can extend within said first and second fan engaging members 391/392.

11. The box fan securing device 100 of any one of embodiments 6 to 10, wherein each of said one or more fan engaging members 305 is substantially parallel (or is parallel) with said first and second sash-contacting members 11/31.

12. The box fan securing device 100 of any one of embodiments 6 to 11, wherein each of said one or more complementary fan connecting components 310 comprise a hole or slot 310 within the outer surface 315 of the fan 300.

13. The box fan securing device 100 of embodiment 5, wherein said device central portion 101 further comprises first and second fan-contacting members 12/22 extending downward from said device central portion 101, said first and second fan-contacting members 12/22 being spaced from one another by a distance $D_d$ that is less than, equal to, or greater than a fan width $W_f$; said box fan securing device 100 being sized so as to be positionable between a window sash edge 201 of a window sash 200 and a fan edge 301 of a fan 300 so as to secure the fan 300 to the window sash 200.

14. A box fan securing device 100 comprising: a device central portion 101; first and second sash-contacting members 11/31 extending upward from said device central portion 101, said first and second sash-contacting members 11/31 being spaced from one another by a distance $D_u$ that is less than, equal to, or greater than a window sash width $W_{wf}$; and first and second fan-contacting members 12/22 extending downward from said device central portion 101, said first and second fan-contacting members 12/22 being spaced from one another by a distance $D_d$ that is less than, equal to, or greater than a fan width $W_f$; said box fan securing device 100 being sized so as to be positionable between a window sash edge 201 of a window sash 200 and a fan edge 301 of a fan 300 so as to secure the fan 300 to the window sash 200.

15. The box fan securing device 100 of any one of embodiments 1 to 14, wherein distance $D_u$ is equal to or greater than window sash width $W_{wf}$.

16. The box fan securing device 100 of any one of embodiments 1 to 15, wherein distance $D_d$ is equal to or greater than fan width $W_f$.

17. The box fan securing device 100 of any one of embodiments 13 to 16, wherein said second fan-contacting member 22 is movable relative to said first fan-contacting member 12.

18. The box fan securing device 100 of any one of embodiments 1 to 17, wherein said second sash-contacting member 31 is movable relative to said first sash-contacting member 11.

19. The box fan securing device 100 of any one of embodiments 13 to 18, further comprising a first locking member 13 that temporarily locks said second fan-contacting member 22 in a position relative to said first fan-contacting member 12.

20. The box fan securing device 100 of any one of embodiments 1 to 19, further comprising a second locking member 33 that temporarily locks said second sash-contacting member 31 in a position relative to said first sash-contacting member 11.

21. The box fan securing device 100 of any one of embodiments 1 to 20, wherein said box fan securing device 100 comprises a base component 10, said base component 10 representing at least a portion of said device central portion 101 and comprising said first sash-contacting member 11.

22. The box fan securing device 100 of any one of embodiments 13 to 21, wherein said box fan securing device 100 comprises a base component 10, said base component 10 representing at least a portion of said device central portion 101 and comprising (i) said first sash-contacting member 11 and (ii) said first fan-contacting member 12.

23. The box fan securing device 100 of any one of embodiments 13 to 22, wherein said box fan securing device 100 comprises a front component 20, said front component 20 representing at least a portion of said device central portion 101 and comprising said second fan-contacting member 22.

24. The box fan securing device 100 of any one of embodiments 1 to 23, wherein said box fan securing device 100 comprises a top component 30, said top component 30 comprising said second sash-contacting member 31.

25. The box fan securing device 100 of any one of embodiments 21 to 24, wherein said base component 10 has a base component upper surface 15 and a base component lower surface 16, said first sash-contacting member 11 extending above said base component upper surface 15.

26. The box fan securing device 100 of embodiment 25, wherein said base component 10 further comprises said first fan-contacting member 12 extending below said base component lower surface 16.

27. The box fan securing device 100 of embodiment 26, wherein said first fan-contacting member 12 extends along and forms a base component outer edge 17, and said first sash-contacting member 11 is positioned a distance $D_{bw}$ from said base component outer edge 17 and between said base component outer edge 17 and a base component contact edge 18 opposite said base component outer edge 17.

28. The box fan securing device 100 of embodiment 25, wherein said first sash-contacting member 11 extends along and forms a base component outer edge 17.

29. The box fan securing device 100 of any one of embodiments 23 to 28, wherein said base component 10 further comprises base component engaging members 19 positioned along said base component upper surface 15, said base component engaging members 19 being sized to engage with a portion (i.e., outer side edges) of (i) said front component 20 or (ii) said top component 30.

30. The box fan securing device 100 of embodiment 29, wherein said base component engaging members 19 are positioned along opposite sides 151/152 of said base component upper surface 15, and extend a length $L_{bcem}$ between said first sash-contacting member 11 and said base component contact edge 18.

31. The box fan securing device 100 of any one of embodiments 23 to 30, wherein said base component 10 further comprises base component locking members 13 positioned along said base component upper surface 15, said base component locking members 13 being sized to engage with (i) corresponding front component locking members 23 so as to temporarily lock said front component 20 relative to said base component 10 or (ii) corresponding top component locking members 33 so as to temporarily lock said top component 30 relative to said base component 10.

32. The box fan securing device 100 of embodiment 31 wherein said base component locking members 13 are centrally positioned along said base component upper surface 15 between said base component engaging members 19 positioned along opposite sides 151/152 of said base component upper surface 15.

33. The box fan securing device 100 of any one of embodiments 29 to 32, wherein said base component engaging members 19 comprise (i) a base component first engaging member 191 positioned along a first side 151 of said base component upper surface 15, and extending a length $L_{bcem}$ between said first sash-contacting member 11 and said base component contact edge 18 (e.g., the full length between said first sash-contacting member 11 and said base component contact edge 18 or less than the full length), the base component first engaging member 191 comprising a first vertically-extending base component engaging member wall 191v and a first horizontally-extending base component projection 191h extending towards a central portion 153 of said base component upper surface 15, and (ii) a base component second engaging member 192 positioned along an opposite second side 152 of said base component upper surface 15, and extending a length $L_{bcem}$ between said first sash-contacting member 11 and said base component contact edge 18 (e.g., the full length between said first sash-contacting member 11 and said base component contact edge 18 or less than the full length), the base component second engaging member 192 comprising a second vertically-extending base component engaging member wall 192v and a second horizontally-extending base component projection 192h extending towards a central portion 153 of said base component upper surface 15 so that a distance $D_{bch}$ between said first and second horizontally-extending base component projections 191h/192h is less than a distance $D_{bcv}$ between said first and second vertically-extending base component engaging member walls 191v/192v.

34. The box fan securing device 100 of embodiment 33, wherein a base component lower overhanging surface 195 of each of said first and second horizontally-extending base component projections 191h/192h comprises (i) base component surface undulations 196 thereon or (ii) a smooth surface with no undulations thereon.

35. The box fan securing device 100 of embodiment 34, wherein said base component lower overhanging surface 195 is positioned a base component distance $D_{bcos}$ above said base component upper surface 15 with base component distance $D_{bcos}$ being substantially equal to a thickness of (i) opposite outer side edges 251/252 of said front component 20 so that said opposite outer side edges 251/252 of said front component 20 can extend within said first and second base component engaging members 191/192 or (ii) opposite outer side edges 351/352 of said top component 30 so that said opposite outer side edges 351/352 of said top component 30 can extend within said first and second base component engaging members 191/192.

36. The box fan securing device 100 of any one of embodiments 23 to 35, wherein said front component 20 has a front component upper surface 25 and a front component lower surface 26, said second fan-contacting member 22 extending below said front component lower surface 26.

37. The box fan securing device 100 of embodiment 36, wherein said second fan-contacting member 22 extends along and forms a front component outer edge 27 of said front component 20, and said front component 20 comprises a front component contact edge 28 opposite said front component outer edge 27.

38. The box fan securing device 100 of embodiment 36 or 37, wherein said front component 20 further comprises front component engaging members 29 positioned along said front component upper surface 26, said front component engaging members 29 being sized to engage with and temporarily lock onto a portion of said top component 30.

39. The box fan securing device 100 of embodiment 38, wherein said front component engaging members 29 (i) are positioned along opposite side edges 251/252 of said front component upper surface 26 at a distance $D_{fcem}$ from opposite side edges 251/252 of said front component upper surface 26, and (ii) extend a length $L_{bcem}$ between said front component outer edge 27 and said front component contact edge 28.

40. The box fan securing device 100 of any one of embodiments 36 to 39, wherein said front component 20 further comprises corresponding front component locking members 23 positioned along said front lower component surface 26, said corresponding front component locking members 23 being sized to engage with said base component locking members 13 so as to temporarily lock said front component 20 relative to said base component 10.

41. The box fan securing device 100 of embodiment 40, wherein said corresponding front component locking members 23 are centrally positioned along said front component lower surface 26.

42. The box fan securing device 100 of embodiment 40 or 41, wherein said front component 20 further comprises a front component unlocking member portion 24, said front component unlocking member 24 portion enabling said corresponding front component locking members 23 to be unlocked from said base component locking members 13.

43. The box fan securing device 100 of embodiment 42, wherein said front component unlocking member portion 24 is centrally positioned along said front component 20 between said front component engaging members 29.

44. The box fan securing device 100 of embodiment 42 or 43, wherein said front component unlocking member portion 24 comprises a front component grasping portion 241 that extends beyond said front component outer edge 27.

45. The box fan securing device 100 of any one of embodiments 42 to 44, wherein opposite side edges 241/242 of said front component unlocking member portion 24 are separated from inner side edges 261/262 of said front component upper and lower surfaces 25/26 by front component gaps 271/272 extending along and between (i) said opposite side edges 241/242 of said front component unlocking member portion 24 and (ii) said front component opposite side edges 241/242.

46. The box fan securing device 100 of any one of embodiments 42 to 45, wherein said second fan-contacting member 22 comprises two spaced apart second fan-contacting members 22a/22b with a second fan-contacting member gap 228 therebetween so that said front component unlocking member portion 24 is movable within said second fan-contacting member gap 228 and between said two spaced apart second fan-contacting members 22a/22b.

47. The box fan securing device 100 of any one of embodiments 42 to 46, wherein said corresponding front component locking members 23 are positioned on a front component unlocking member portion lower surface 246.

48. The box fan securing device 100 of any one of embodiments 42 to 47, wherein said front component unlocking member portion 24 is integrally connected to said front component 20 at a location 258 closer to said front component contact edge 28 and away from said front component outer edge 27.

49. The box fan securing device 100 of any one of embodiments 38 to 48, wherein said front component engaging members 29 comprise (i) a first front component engaging member 291 positioned along a first side edge 251 of said front component upper surface 25, and extending a length $L_{fcem}$ between said front component outer edge 27 and said front component contact edge 28, the first front component engaging member 291 comprising a first vertically-extending front component engaging member wall 291v and a first horizontally-extending front component projection 291h extending towards a central portion 253 of said front component upper surface 25, and (ii) a second front component engaging member 292 positioned along an opposite second side edge 252 of said front component upper surface 25, and extending a length $L_{fcem}$ between said front component outer edge 27 and said front component contact edge 28, the second front component engaging member 292 comprising a second vertically-extending front component engaging member wall 292v and a second horizontally-extending front component projection 292h extending towards a central portion 253 of said front component upper surface 25 so that a distance $D_{fch}$ between said first and second horizontally-extending front component projections 292h is less than a distance $D_{fcv}$ between said first and second vertically-extending front component engaging member walls 292v.

50. The box fan securing device 100 of embodiment 49, wherein a front component lower overhanging surface 295 of each of said first and second horizontally-extending front component projections 291h/292h comprises front component surface undulation locking members 296 thereon.

51. The box fan securing device 100 of embodiment 50, wherein said front component lower overhanging surface 295 is positioned a front component distance $D_{fcos}$ above said front component upper surface 25 with distance $D_{fcos}$ being substantially equal to a thickness of opposite outer side edges 251/252 of said top component 20 so that (i) said opposite outer side edges 251/252 of said top component 20 and (ii) corresponding top component locking members 33 can extend within and be temporarily locked onto said first and second front component engaging members 291/292.

52. The box fan securing device 100 of any one of embodiments 24 to 35, wherein said top component 30 has a top component upper surface 35 and a top component lower surface 36, said second sash-contacting member 31 extending above said top component upper surface 35.

53. The box fan securing device 100 of embodiment 52, wherein said second sash-contacting member 31 extends along and forms a top component front edge 37 of said top component 30, and said top component 30 comprises a top component grasping edge 38 opposite said top component front edge 37.

54. The box fan securing device 100 of embodiment 52, wherein said second sash-contacting member 31 extends upward from said top component upper surface 35 between a top component front edge 37 of said top component 30, and a top component grasping edge 38 opposite said top component front edge 37.

55. The box fan securing device 100 of any one of embodiments 52 to 54, wherein said top component 30 further comprises corresponding top component locking members 33 positioned along said top component upper surface 35, said corresponding top component locking members 33 being sized to engage with (i) front component surface undulation locking members 296 so as to temporarily lock said top component 30 relative to said front component 20 or (ii) said base component locking members 13.

56. The box fan securing device 100 of any one of embodiments 52 to 54, wherein said top component 30 further comprises corresponding top component locking members 33 positioned along said top component lower surface 36, said corresponding top component locking members 33 being sized to engage with top component surface undulation locking members 33 so as to temporarily lock said top component 30 relative to said base component 10.

57. The box fan securing device 100 of embodiment 55, wherein said corresponding top component locking members 33 are positioned along opposite side edges 351/352 of said top component upper surface 35.

58. The box fan securing device 100 of embodiment 56, wherein said corresponding top component locking members 33 are positioned along a central location of said top component lower surface 36.
59. The box fan securing device 100 of any one of embodiments 55 to 58, wherein said top component 30 further comprises a top component unlocking member portion 34, said top component unlocking member portion 34 enabling said corresponding top component locking members 33 to be unlocked from (i) said front component surface undulation locking members 296 or (ii) said top component locking members 33.
60. The box fan securing device 100 of embodiment 59, wherein said top component unlocking member portion 34 is centrally positioned along said top component 30 between said top component front edge 37 and said top component grasping edge 38, and forms at least a portion of (or all of) said top component grasping edge 38.
61. The box fan securing device 100 of embodiment 59 or 60, wherein said top component unlocking member portion 34 comprises a top component grasping portion 348 that extends above said top component upper surface 35.
62. The box fan securing device 100 of any one of embodiments 59 to 61, wherein opposite side edges 341/342 of said top component unlocking member portion 34 are separated from inner side edges 361/362 of said top component upper and lower surfaces 35/36 by top component gaps 371/372 extending along and between (i) said opposite edges 341/342 of said top component unlocking member portion 34 and (ii) said inner side edges 361/362 of said top component upper and lower surfaces 35/36.
63. The box fan securing device 100 of any one of embodiments 55 to 62, wherein said corresponding top component locking members 33 are positioned on a top component unlocking member portion upper surface 345.
64. The box fan securing device 100 of any one of embodiments 55 to 63, wherein said corresponding top component locking members 33 are positioned on a top component unlocking member portion lower surface 355.
65. The box fan securing device 100 of any one of embodiments 59 to 64, wherein said top component unlocking member portion 34 is integrally connected to said top component 30.
66. The box fan securing device 100 of any one of embodiments 1 to 65, wherein each component (e.g., exemplary components 10/20/30) of said box fan securing device 100 independently comprises a polymeric material, a fiber-reinforced polymeric material, a metallic material, a cellulosic material, or any combination thereof. Typically, each component (e.g., exemplary components 10/20/30) of said box fan securing device 100 independently comprises a polymeric material or a fiber-reinforced polymeric material.
67. The box fan securing device 100 of any one of embodiments 1 to 66, wherein each component (e.g., exemplary components 10/20/30) of said box fan securing device 100 independently has any desired dimensions. Typically, the box fan securing device 100 has the following dimensions: (1) an overall width of from 1.0 inch (in) to about 12.0 in (or any value between and including 1.0 in and 12.0 in, in increments of 0.1 in, e.g., 3.5 in, or any ranges of values between and including 1.0 in and 12.0 in, in increments of 0.1 in, e.g., from about 4.7 in to about 9.5 in); (2) an overall length of from 1.0 inch (in) to about 12.0 in (or any value between and including 1.0 in and 12.0 in, in increments of 0.1 in, e.g., 3.5 in, or any ranges of values between and including 1.0 in and 12.0 in, in increments of 0.1 in, e.g., from about 4.7 in to about 9.5 in); and (3) an overall height of from 1.0 inch (in) to about 12.0 in (or any value between and including 1.0 in and 12.0 in, in increments of 0.1 in, e.g., 3.5 in, or any ranges of values between and including 1.0 in and 12.0 in, in increments of 0.1 in, e.g., from about 4.7 in to about 9.5 in). More typically, the box fan securing device 100 has the following dimensions: (1) an overall width of from 1.0 inch (in) to about 3.0 in (or any value between and including 1.0 in and 3.0 in, in increments of 0.1 in, e.g., 2.1 in, or any ranges of values between and including 1.0 in and 3.0 in, in increments of 0.1 in, e.g., from about 1.7 in to about 2.5 in); (2) an overall length of from 1.0 inch (in) to about 5.0 in (or any value between and including 1.0 in and 5.0 in, in increments of 0.1 in, e.g., 4.4 in, or any ranges of values between and including 1.0 in and 5.0 in, in increments of 0.1 in, e.g., from about 4.1 in to about 4.8 in); and (3) an overall height of from 1.0 inch (in) to about 4.0 in (or any value between and including 1.0 in and 4.0 in, in increments of 0.1 in, e.g., 2.3 in, or any ranges of values between and including 1.0 in and 4.0 in, in increments of 0.1 in, e.g., from about 1.8 in to about 2.5 in).

Box Fan Combinations

68. A box fan 300 comprising the box fan securing device 100 of any one of embodiments 1 to 67.
69. The box fan 300 of any one of embodiments 1 to 4, 15-16, 18, 20-21, 24-25, 28-35 and 52-67, wherein the box fan securing device 100 is an integral component of the box fan 300.
70. The box fan 300 of any one of embodiments 1 and 5 to 67, wherein the box fan securing device 100 is connectable or connected to the box fan 300.

Kits Containing One or More Box Fan Securing Device Components

71. A kit 400 comprising one or more of the above described components (e.g., base component 10, top component 30, front component 20, or any combination thereof) within the box fan securing device 100 of any one of embodiments 1 to 67.
72. The kit 400 of embodiment 71, wherein one or more of the above described components (e.g., base component 10, top component 30, front component 20, or any combination thereof) of the box fan securing device 100 is each independently separate from, separatable from, and/or connectable to, the box fan 300.
73. The kit 400 of embodiment 71 or 72, further comprising one or more additional kit components comprising: one or more screws, one or more bolts, one or more lengths of tape, or any combination thereof.
74. The kit 400 of any one of embodiments 71 to 73, further comprising a fan 300. It should be understood that the term "box fan 300" used throughout the present disclosure also represents any other type of fan 300.
75. The kit 400 of embodiment 74, wherein the fan 300 is a box fan 300.

Methods of Making Box Fan Securing Devices

76. A method of making the box fan securing device 100 of any one of embodiments 1 to 67, said method comprising: forming or thermoforming one or more components recited in any one of embodiments 1 to 67 (e.g., exemplary components 10/20/30).
77. The method of embodiment 76, wherein said thermoforming step comprises injection molding one or more components recited in any one of embodiments 1 to 67 (e.g., exemplary components 10/20/30).
78. The method of embodiment 76 or 77, further comprising assembling/combining one or more components (e.g., exemplary components 10/20/30) with one another.

79. The method of any one of embodiments 76 to 78, wherein said forming or thermoforming step comprises forming a component of a fan 300.
80. The method of any one of embodiments 76 to 79, wherein said forming or thermoforming step comprises forming a component of the box fan securing device 100 that is connectable to a fan 300.

Methods of Using Box Fan Securing Devices

81. A method of using the box fan securing device 100 of any one of embodiments 1 to 67, said method comprising: positioning the box fan securing device 100 proximate a window sash 200.
82. The method of embodiment 81, said method comprising: positioning the box fan securing device 100 between a window sash 200 and a box fan 300.
83. The method of embodiment 81 or 82, further comprising: moving the window sash 200 towards the fan 300.
84. The method of any one of embodiments 81 to 83, further comprising: positioning a portion of the window sash 200 between the first and second sash-contacting members 11/31.
85. The method of any one of embodiments 81 to 84, further comprising: positioning a portion of the box fan 300 between the first and second fan-contacting members 12/22.
86. The method of any one of embodiments 81 to 85, further comprising: moving the first and second sash-contacting members 11/31 towards one another and the window sash 200.
87. The method of any one of embodiments 81 to 86, further comprising: moving the first and second fan-contacting members 12/22 towards one another and the fan 300.
88. The method of any one of embodiments 81 to 87, further comprising: cutting on or off the box fan 300.
89. The method of any one of embodiments 81 to 88, further comprising: moving the window sash 200 away from the fan 300.
90. The method of any one of embodiments 81 to 89, further comprising: removing the box fan securing device 100 from between the window sash 200 and the box fan 300.

It should be understood that although the above-described box fan securing devices, box fan securing device/box fan combinations, and methods are described as "comprising" one or more components or steps, the above-described box fan securing devices, box fan securing device/box fan combinations, and methods may "comprise," "consists of," or "consist essentially of" any of the above-described components or steps of the box fan securing devices, box fan securing device/box fan combinations, and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a box fan securing device, box fan securing device/box fan combination, and/or method that "comprises" a list of elements (e.g., components or steps) is not necessarily limited to only those elements (or components or steps), but may include other elements (or components or steps) not expressly listed or inherent to the box fan securing device, box fan securing device/box fan combination, and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a box fan securing device, box fan securing device/box fan combination, and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described box fan securing devices, box fan securing device/box fan combinations, and methods may comprise, consist essentially of, or consist of any of the herein-described components and features, as shown in the figures with or without any feature(s) not shown in the figures. In other words, in some embodiments, the box fan securing devices, box fan securing device/box fan combinations, and methods of the present invention do not have any additional features other than those shown in the figures, and such additional features, not shown in the figures, are specifically excluded from the box fan securing devices, box fan securing device/box fan combinations, and methods. In other embodiments, the box fan securing devices, box fan securing device/box fan combinations, and methods of the present invention do have one or more additional features that are not shown in the figures.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Box fan securing devices, box fan securing device/box fan combinations, and methods, as described in embodiments 1 to 67, and as shown in FIGS. 1-19, were prepared.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A box fan securing device for securing a box fan within a window pane, said box fan securing device comprising:

a base component separate from and engagable with the box fan, said base component comprising (i) a first sash-contacting member extending upward from a base component upper surface, (ii) one or more first fan-engaging members extending below a base component lower surface and positioned along a first edge of said base component, (iii) one or more second fan-engaging members extending below said base component lower surface and positioned along an opposite edge of said base component, each of said one or more first fan-engaging members and said one or more second fan-engaging members being sized and configured to be connectable to one or more complementary fan connecting components of the box fan, (iv) base component locking members positioned along said base component upper surface, said base component locking members being engagable with one or more top component locking members of a top component, and (v) base component engaging members positioned along opposite sides of said base component upper surface, said base component engaging members being sized to engage with the top component; and the top component, wherein the top component is (a) separate from the box fan and said base component and (b) engagable with said base component, and comprises (i) a second sash-contacting member extending upward from a top component upper surface, and (ii) one or more top component locking members extending along a top component lower surface and positioned so as to be engagable with said base component locking members so as to temporarily lock said top component onto said base component;

said first and second sash-contacting members being spaced from one another by an adjustable distance $D_u$ that is less than, equal to, or greater than a window sash width $W_{wf}$ with said second sash-contacting member of said top component being movable relative to said first sash-contacting member of said base component;

wherein said box fan securing device is sized so as to extend from and be positioned between (i) an outer surface of the box fan and (ii) a window sash edge of a window sash so as to secure the box fan to the window sash.

2. The box fan securing device of claim 1, wherein said base component comprises four fan-engaging members.

3. The box fan securing device of claim 1, wherein (i) each of the one or more first fan-engaging members comprises a first fan-engaging member comprising a first vertically-extending fan-engaging member wall and a first horizontally-extending fan-engaging member projection extending towards a central portion of said base component, and (ii) each of the one or more second fan-engaging members comprises a second vertically-extending fan-engaging member wall and a second horizontally-extending fan-engaging member projection extending towards the central portion of said base component so that a distance $D_{bfp}$ between said first and second horizontally-extending base component projections is less than a distance $D_{vfc}$ between said first and second vertically-extending fan-engaging member walls.

4. The box fan securing device of claim 3, wherein a fan-engaging member upper overhanging surface of each of said first and second horizontally-extending fan-engaging member projections is a fan-engaging member distance $D_{fed}$ below the base component lower surface with the fan-engaging member distance $D_{fed}$ being substantially equal to a thickness of opposite outer side edges of the one or more complementary fan-connecting components so that the opposite outer side edges of the one or more complementary fan-connecting components can extend within said one or more first fan-engaging members and said one or more second fan-engaging members.

5. The box fan securing device of claim 4, wherein each of said one or more first fan-engaging members and said one or more second fan-engaging members is substantially parallel with said first and second sash-contacting members.

6. The box fan securing device of claim 1 in combination with the box fan, said box fan comprising one or more complementary fan connecting components sized to be engagable with said one or more first fan engaging members and said one or more second fan engaging members, each of said one or more complementary fan connecting components comprising a hole or slot within an outer surface of the box fan.

7. The box fan securing device of claim 1, wherein said base component engaging members are sized and positioned so as to engage with outer side edges of said top component.

8. A box fan securing device for securing a box fan within a window pane, said box fan securing device (a) being separate from and engagable with the box fan, and (b) comprising:

first and second sash-contacting members, said first and second sash-contacting members being spaced from one another by an adjustable distance $D_u$ that is less than, equal to, or greater than a window sash width $W_{wf}$;

said box fan securing device being sized so as to extend from an outer upper surface of the box fan positioned within a window frame to a window sash edge of a window sash within the window frame so as to secure the box fan to the window sash with said first and second sash-contacting members (i) being positionable along opposite interior and exterior side surfaces of the window sash, (ii) extending upward and away from the outer upper surface of the box fan, and (iii) being movable so as to contact and clamp onto the opposite interior and exterior side surfaces of the window sash, and said box fan securing device comprising (i) a base component separate from and engagable with the box fan, said base component comprising said first sash-contacting member, and (ii) a top component separate from the box fan, said top component comprising said second sash-contacting member, and being engagable with said base component, wherein said box fan securing device either (1) clamps onto opposite side surfaces of the box fan or (2) engages with one or more complementary fan connecting components of the box fan.

9. The box fan securing device of claim 8, wherein said base component further comprises (i) one or more first fan-engaging members extending below a base component lower surface and positioned along a first edge of said base component, and (ii) one or more second fan-engaging members extending below said base component lower surface and positioned along an opposite edge of said base component, each of said one or more first fan-engaging members and said one or more second fan-engaging members being sized and configured to be connectable to the one or more complementary fan connecting components of ft the box fan.

10. The box fan securing device of claim 8, wherein said base component further comprises a first fan-contacting member extending below a base component lower surface, and said box fan securing device further comprises:
  a front component separate from and engagable with said base component, said front component comprising (i) a second fan-contacting member extending below a front component lower surface, (ii) front component locking members positioned along said front lower component surface, said front component locking members being sized to engage with base component locking members of said base component so as to temporarily lock said front component relative to said base component, and (iii) front component engaging members positioned along said front component upper surface, said front component engaging members being sized to engage with said top component.

11. A box fan securing device for securing a box fan within a window pane, said box fan securing device comprising:
  a base component separate from and engagable with ft the box fan, said base component comprising (i) a first sash-contacting member extending upward from a base component upper surface, (ii) a first fan-contacting member extending below a base component lower surface, (iii) base component locking members positioned along said base component upper surface, and (iv) base component engaging members positioned along opposite sides of said base component upper surface;
  a front component separate from and engagable with said base component, said front component comprising (i) a second fan-contacting member extending below a front component lower surface, (ii) front component locking members positioned along said front lower component surface, said front component locking members being sized to engage with said base component locking members so as to temporarily lock said front component relative to said base component, and (iii) front component engaging members positioned along said front component upper surface; and
  a top component separate from and engagable with said front component, said top component comprising (i) a second sash-contacting member extending upward from a top component upper surface, and (ii) top component locking members extending along said top component upper surface and positioned so as to be engagable with said front component engaging members so as to temporarily lock said top component onto said front component;
  said first and second sash-contacting members being spaced from one another by a distance $D_u$ that is less than, equal to, or greater than a window sash width $W_{wf}$ with said second sash-contacting member of said top component being movable relative to said first sash-contacting member of said base component,
  wherein said box fan securing device is sized so as to extend from and be positioned between (i) an outer surface of the box fan and (ii) a window sash edge of a window sash so as to secure the box fan to the window sash.

12. The box fan securing device of claim 11, wherein said base component engaging members comprise (i) a base component first engaging member positioned along a first side of said base component upper surface, and extending a length $L_{bcem}$ between said first sash-contacting member and a base component contact edge, the base component first engaging member comprising a first vertically-extending base component engaging member wall and a first horizontally-extending base component projection extending towards a central portion of said base component upper surface, and (ii) a base component second engaging member positioned along an opposite second side of said base component upper surface, and extending length $L_{bcem}$ between said first sash-contacting member and said base component contact edge, the base component second engaging member comprising a second vertically-extending base component engaging member wall and a second horizontally-extending base component projection extending towards a central portion of said base component upper surface so that a distance $D_{bch}$ between said first and second horizontally-extending base component projections is less than a distance $D_{bcv}$ between said first and second vertically-extending base component engaging member walls.

13. The box fan securing device of claim 12, wherein a base component lower overhanging surface of each of said first and second horizontally-extending base component projections comprises (i) base component surface undulations thereon or (ii) a smooth surface with no undulations thereon.

14. The box fan securing device of claim 13, wherein said base component lower overhanging surface is positioned a base component distance $D_{bcos}$ above said base component upper surface with base component distance $D_{bcos}$ being substantially equal to a thickness of (i) opposite outer side edges of said front component so that said opposite outer side edges of said front component can extend within said first and second base component engaging members.

15. The box fan securing device of claim 11, wherein said front component further comprises a front component unlocking member portion, said front component unlocking member portion enabling said front component locking members to be unlocked from said base component locking members.

16. The box fan securing device of claim 11, wherein said front component engaging members comprise (i) a first front component engaging member positioned along a first side edge of said front component upper surface, and extending a length $L_{fcem}$ between a front component outer edge and a front component contact edge, the first front component engaging member comprising a first vertically-extending front component engaging member wall and a first horizontally-extending front component projection extending towards a central portion of said front component upper surface, and (ii) a second front component engaging member positioned along an opposite second side edge of said front component upper surface, and extending length $L_{fcem}$ between said front component outer edge and said front component contact edge, the second front component engaging member comprising a second vertically-extending front component engaging member wall and a second horizontally-extending front component projection extending towards a central portion of said front component upper surface so that a distance $D_{fch}$ between said first and second horizontally-extending front component projections is less than a distance $D_{fcv}$ between said first and second vertically-extending front component engaging member walls.

17. The box fan securing device of claim 16, wherein a front component lower overhanging surface of each of said first and second horizontally-extending front component projections comprises front component surface undulation locking members thereon.

18. The box fan securing device of claim 17, wherein said front component lower overhanging surface is positioned a front component distance $D_{fcos}$ above said front component upper surface with distance $D_{fcos}$ being substantially equal to a thickness of opposite outer side edges of said top component so that (i) said opposite outer side edges of said top component and (ii) corresponding top component locking members can extend within and be temporarily locked onto said first and second front component engaging members.

19. The box fan securing device of claim 11, wherein said top component further comprises a top component unlocking member portion, said top component unlocking member portion enabling said top component locking members to be unlocked from said front component engaging members.

20. The box fan securing device of claim 11 in combination with the box fan.

* * * * *